United States Patent [19]
Alfano et al.

[11] Patent Number: 5,323,260
[45] Date of Patent: Jun. 21, 1994

[54] METHOD AND SYSTEM FOR COMPRESSING AND AMPLIFYING ULTRASHORT LASER PULSES

[76] Inventors: Robert R. Alfano, 3777 Independence Ave., Bronx, N.Y. 10463; Ping Po Ho, 240-42 69th Ave., Douglaston, N.Y. 11362; Quan-Zhen Wang, 500 W. 122nd St. 4-E, New York, N.Y. 10027

[21] Appl. No.: 847,488

[22] Filed: Mar. 9, 1992

Related U.S. Application Data

[63] Continuation-in-part of Ser. No. 749,044, Aug. 23, 1991, abandoned.

[51] Int. Cl.$^5$ .......................... G02F 1/35; H04B 10/14
[52] U.S. Cl. ................................. 359/244; 359/241; 359/341; 385/3
[58] Field of Search ............... 359/160, 241, 244, 333, 359/341; 385/3, 122; 372/21

[56] References Cited

U.S. PATENT DOCUMENTS

| | | | |
|---|---|---|---|
| 4,528,464 | 7/1985 | Chemla et al. | 359/333 |
| 4,558,921 | 12/1985 | Hasegawa et al. | |
| 5,015,054 | 5/1991 | Chafee | 359/244 |
| 5,111,312 | 5/1992 | Stewart | 359/562 |
| 5,150,248 | 9/1992 | Alfano et al. | 359/160 |
| 5,162,939 | 11/1992 | Herron et al. | 359/326 |

FOREIGN PATENT DOCUMENTS 0409660 2/1990 European Pat. Off.

OTHER PUBLICATIONS

Agrawal et al, opt. Lett., vol. 14, #2, pp. 137-139, Jan. 15, 1989; only abst. provided herewith.
Agrawal et al., Phys. Rev. A., Gen. Phys., vol. 40, #9, pp. 5063-5072, Nov. 1, 1989; abst. only supplied.
Baldech et al., J. Lightwave technol., vol. Lt-5, #12, pp. 1712-1715, Dec. 1987; abst. only supplied.
Alfano et al., J. Opt. Soc. Am. B. Opt. Phys., vol. 6, #4, pp. 824-829, Apr. 1989; abst only supplied.
DeSpirito et al., Opt. Lett, vol. 14, #24, pp. 1356-1358, Dec. 15, 1989; abst. only provided.
Alfano et al., IEEE J. QE., vol. 24, #2, Feb. 2, 1988, pp. 351-364; abst. only supplied.
Chaffee et al., Conf. on Lasers-Electro-Optics, Apr. 28, 1989, p. 168-169; abst. only supplied.
Ho et al., J. Opt. Soc. Am. B., Opt. Phys. vol. 7, #3, pp. 276-284, Mar. 1990; abst. only supplied.
J. Gersten, et al. Phys. Rev. A 21, pp. 1222-1224, (1980).
A. Chraplyvy, et al. Lightwave Technol. LT-2,6 (1984); Electron, Lett:20, 996(1984).
A. Johnson, et al. Ultrafast Phenomena, V.G. Fleming, A. Siegman, Eds. (Springer-Verlag, N.Y. 1986)p. 160; R. Stolen, et al. IEEE J.G.E., GE-22, 2154 (1986).
G. Agrawal, Phys. Rev. Lett. 59, 880 (1987); G. Agrawal, Nonlinear Optics (Academic Press, 1989).
M. N. Islam, et al. Opt. Lett. 12, pp. 625 (1987).
D. Schadt, et al. J. Opt. Soc. Am. 85 pp. 2374 (1988).
J. Manassah, Appl. Opt. 26, pp. 3747 (1987).
R. R. Alfano, et al. Phys. Rev. A 35, pp. 459 (1987).
P. P. Ho, et al. Appl. Phys. Lett. 54, pp. 111 (1989).

(List continued on next page.)

*Primary Examiner*—Nelson Moskowitz
*Attorney, Agent, or Firm*—Kriegsman & Kriegsman

[57] ABSTRACT

A method and system for compressing and amplifying light pulses using degenerate cross-phase modulation and degenerate four-wave mixing. A probe pulse and a pair of pump pulses are arranged so as to copropogate in condensed matter with the pump pulses having the same frequency as the probe pulse. The first pump pulse overlaps with the front end of the probe pulse while, the second pump pulse overlaps with the tail end of the probe pulse. The probe pulse is linearly polarized. The pump pulses are orthogonally polarized relative to the probe pulse so that they can be filtered out using a polarizer and have a greater intensity than the probe pulse. The propagation constant mismatch between the probe pulse and the pump pulses is equal to about zero.

9 Claims, 6 Drawing Sheets

OTHER PUBLICATIONS

P. L. Baldeck, et al. Journal of Lightwave Technology, vol. LT5, pp. 1712 (1987).

R. R. Alfano, et al. J. Opt. Soc. Am. V.5, pp. 824–829, (1988).

G. P. Agrawal, et al. Optics Letters, 14, pp. 137–139, (1989).

J. T. Manassah, et al. Optics Letters, vol. 13, pp. 752–754, (1988).

P. L. Baldeck, et al. Optics Letters, vol. 12, pp. 588–589, (1987).

B. Jaskorzynska, et al., IEEE Journal of Quantum Electronics, vol. 40, pp. 5063–5072, (1989).

G. P. Agrawal, et al. Physical Review A, vol. 50, pp. 5063–5072, (1989).

Q. Z. Wang, et al., "Degenerate Cross-Phase-Modulation and Pulse Compression of Ultrashort Laser Pulses", Presented at Lasers 1989, (Dec. 5–9, 1989), Proceedings of Lasers 1989 (Dec. 5–9, 1989, New Orleans).

Q. Z. Wang, et al. Optics Letter, vol. 15, pp. 1023–1025 (1990).

H. Nakatsuka, et al. Optics Letters vol. 5, pp. 13–15, (1981).

J. E. Rothenberg, Optics Letters, vol. 15, pp. 495–497, (1990).

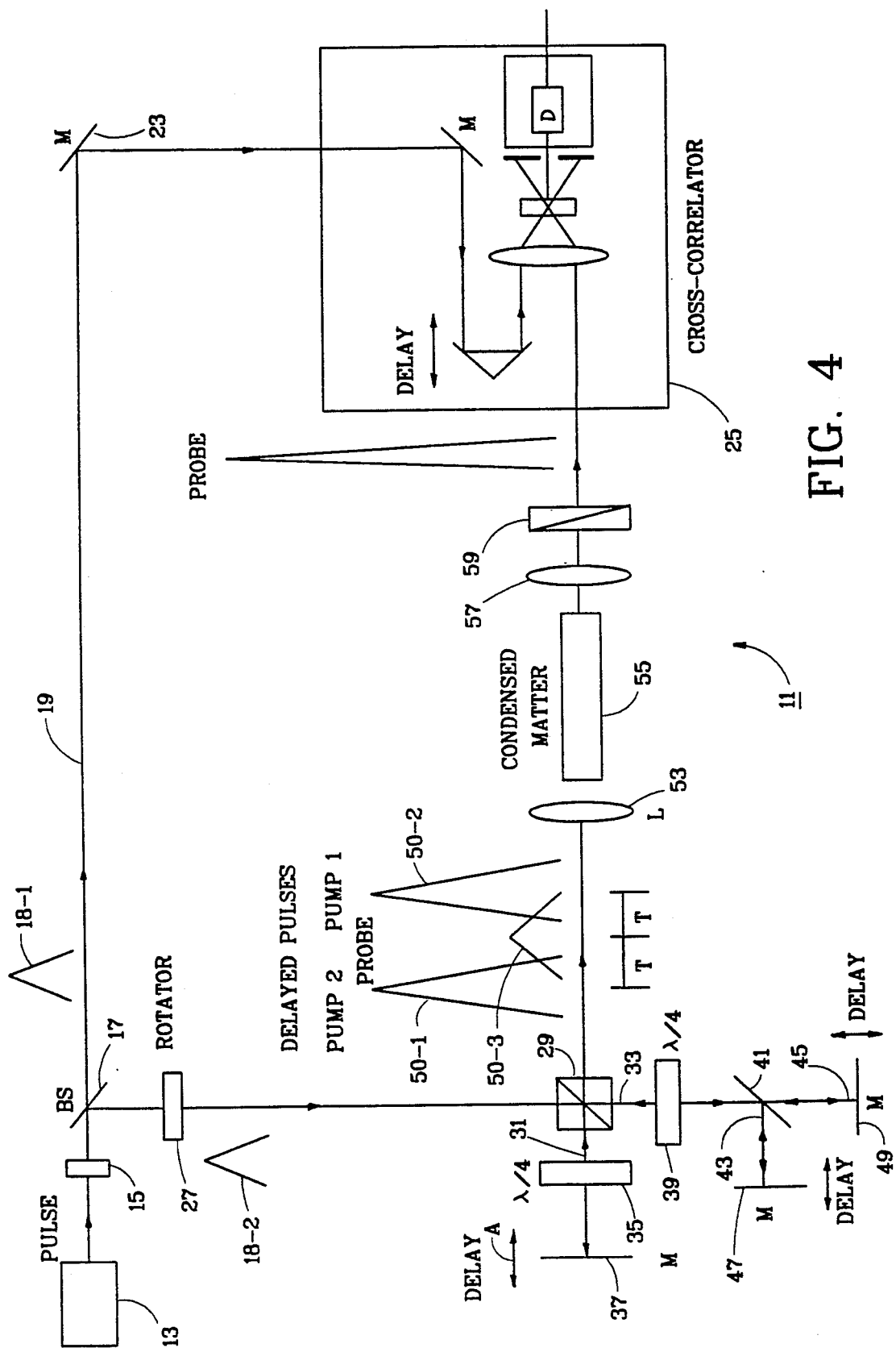

5,323,260

METHOD AND SYSTEM FOR COMPRESSING AND AMPLIFYING ULTRASHORT LASER PULSES

CROSS-REFERENCE TO RELATED APPLICATIONS

This application is a continuation-in-part of pending U.S. Ser. No. 749,044 filed on Aug. 23, 1991 in the names of Robert R. Alfano, Ping Po Ho and Quan-Zhen Wang, now abandoned.

BACKGROUND OF THE INVENTION

The present invention relates to a method and system for compressing and amplifying ultrashort laser pulses.

As used herein, the term "ultrashort laser pulse" refers to a pulse of light in around the picosecond or femtosecond size emitted from a laser.

When an intense ultrashort laser pulse propagates through condensed matter, it temporally distorts the atomic and molecular configuration of the matter. This distortion of the matter instantaneously results in a change in the refractive index of the matter. This change in the index of refraction is directly proportional to the intensity of the propagating intense pulse. The change in the refractive index of the matter, in turn, causes a phase change in the propagating intense light pulse. The phase change causes a frequency sweep within the pulse envelope, typically resulting in a blue shift at the tail end of the pulse and a red shift at the front of the pulse. Typically, the effect is a spectral broadening of the pulse resulting in the generation of a supercontinuum. This spectral effect on the propagating intense light pulse is typically referred to as a self-phase modulation effect.

In addition to experiencing self-phase modulation, an intense ultrashort laser pulse propagating through condensed matter will typically undergo self-focusing, that is, a narrowing of the cross-sectional diameter of the pulse. Self-focusing occurs because, typically, the intensity of a pulse of light is greatest at its center and weakest at its outer edges. Since n is directly proportional to the intensity of the pulse, the center of the pulse causes a greater change in refractive index of the matter than the outer edges of the pulses. Consequently, the center of the pulse travels slower than its outer edges, causing the outer edges to bend in towards the center of the pulse. This effect causes the beam to focus.

In addition to experiencing self-phase modulation and self-focusing, an intense ultrashort laser pulse propagating through condensed matter may also be used to induce the phase modulation of and/or the focusing of a co-propagating weak light pulse. These phenomena are typically referred to as cross-phases modulation and induced focusing, respectively.

Cross-phase modulation may result in either frequency shifting (i.e., blue shifting or red shifting) or spectral broadening (i.e., supercontinuum generation), the particular effect depending on the relative times at which the weak pulse and the intense pulse propagate through the matter. For example, if the intense pulse has a greater wavelength than the weak pulse, the intense pulse will travel faster through the matter. Therefore, if the intense and weak pulses are sent propagating into the matter at the same time, the weak pulse will be exposed predominately to the change in refractive index caused by the tail end of the intense pulse. (This is referred to commonly as tail walk-off). The result of tail walk-off is a blue shift of the weak pulse. Analagously, if the weak pulse is sent propagating into the matter ahead of the intense pulse, the weak pulse will feel the effects of the refractive index change due to the front end of the intense pulse (front walk-off). The result of front walk-off is a shaft of the weak pulse to the red. Finally, if the weak and intense pulses are sent propagating into the material so that the weak pulse is subjected to the changes in the refractive index caused by both the tail end and the front end of the intense pulse (e.g. symmetric walk-off or no walk-off), the weak pulse broadens spectrally to both the red and the blue.

Spectral changes arising from cross-phase modulation may lead to changes in the temporal profile of the weak pulse when it propagates into a dispersive medium (i.e. an optical fiber) or a dispersive optical component (i.e. a grating or a prism). For example, if cross-phase modulation results in the spectral broadening of the weak pulse, a further propagation of the weak pulse through a grating pair may slow down its re-shifted frequencies (generated by XPM at the pulse front) with respect to its blues shifted frequencies (generated by XPM at the pulse back), and consequently reduces the pulse duration of the weak pulse.

Cross-phase modulation may also be used to change the spatial distribution of copropagating weak pulses. This effect occurs when the intense pulse generates a spatially-dependent non-linear refractive index. For example, a pump pulse with a Gaussian spatial distribution of its intensity generates a higher refractive index on the propagation axis of the weak pulse. As a consequence, the outer edges of the weak pulse bend in towards the center of the pulse, and the weak pulse focuses.

As a term of art, cross-phase modulation is frequently used generically to refer to both cross-phase modulation and induced focusing.

Condensed matter is very well known in the art. Examples of condensed matter are BK-7 glass, CdSe, liquid $Cs_2$, NaCl crystal, doped glasses, semiconductor bulk and quantum structures, microcrystalline semiconductor particles in glasses polydiacetylene organic polymer and optical fibers.

SUMMARY OF THE INVENTION

It is an object of this invention to provide a method and system for compressing and amplifying a pulse of light.

It is another object of this invention to provide a method and system for compressing and amplifying a pulse of light which does not involve the use of gratings or prisms.

A method of compressing and amplifying a first pulse of light according to this invention comprises the steps of polarizing said first pulse of light according to one mode of polarization, providing second and third pulses of light, each having the same frequency as said first pulse of light, an intensity greater than said first pulse of light and being polarized according to another state of polarization, and copropagating said two pulses of light through a body of condensed matter such that said second pulse overlaps the front end of said first pulse and said third pulse overlaps the trailing end of said first pulse, the propagation constant mismatch between said first pulse and each of said second and third pulses being about zero, whereby said first pulse of light will be compressed and amplified on passing through said compressed matter.

A system for compressing and amplifying a first pulse to light according to this invention comprises means for polarizing said first pulse of light according to one mode of polarization, means for providing second and third pulses of light each having the same frequency as said first pulse of light, an intensity greater than said first pulse of light to be compressed and amplified and being polarized according to another mode of polarization means for combining said two pulses so as to travel along a common path in overlapping relationship, and condensed matter disposed along said common path, the propagation constant mismatch between the three pulses being about zero, whereby, on passing through said condensed matter said first pulse of light will be compressed and amplified.

Various features, objects and advantages will appear from the description to follow. In the description, reference is made to the accompanying drawings which form a apart thereof, and in which are shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 4 is a schematic representation of an experimental system for use in confirming the principles of this invention;

DETAILED DESCRIPTION OF PREFERRED EMBODIMENTS

Figure 1:
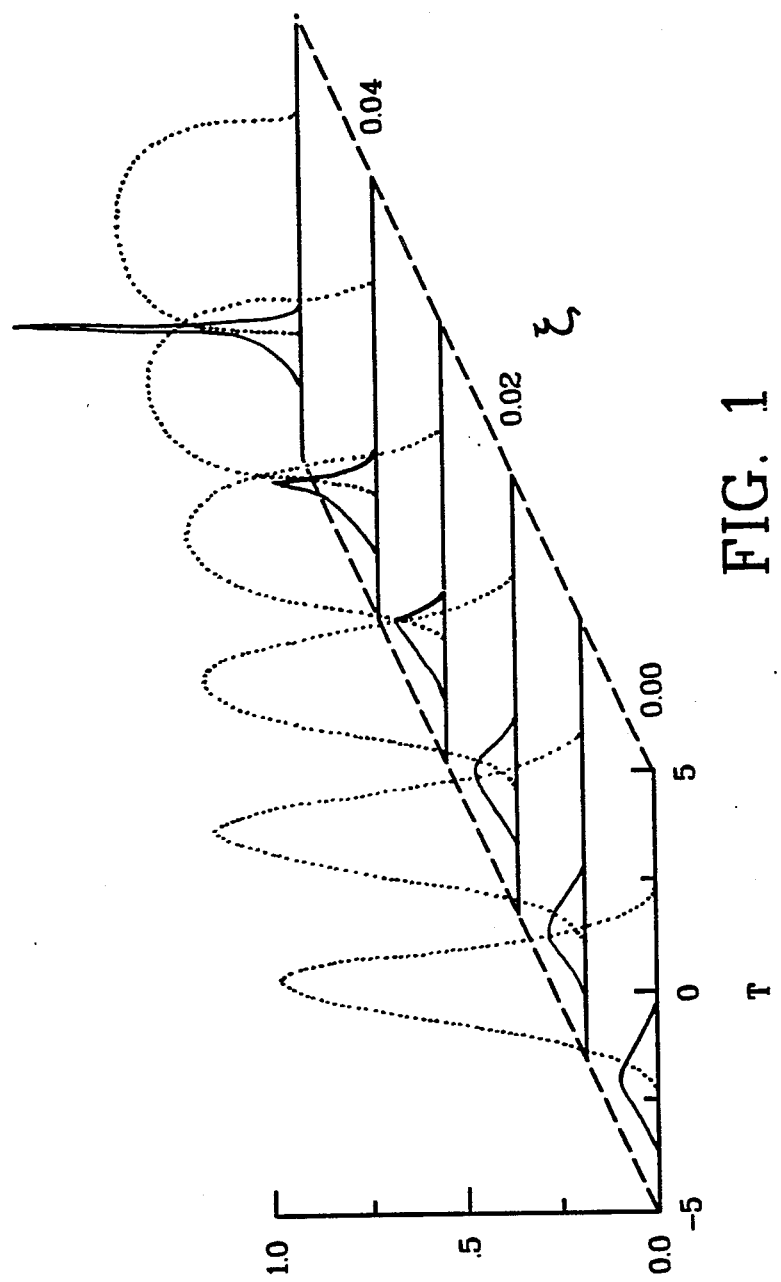
FIG. 1 is a diagram illustrating the changes in envelope shape of a single probe pulse under a single pump pulse degenerate cross phase modulation (DXPM) in normal dispersion regime along the propogation length $N=30$ and $T_d=2$. Solid lines are the evolution of the probe pulse shape enlarged by 10 times. Dotted lines are evolution of the pump pulse shaped.

The present invention is directed to a method and system for compressing and amplifying a pulse of light utilizing the principles of cross-phase modulation (XPM) and degenerate-four-wave mixing (DFWM).

When a weak pulse of light co-propagates through a medium with an intense pulse of light the phase of the weak pulse can be modulated by the time variation of the index of refraction originating from the intense pulse. This process is called cross-phase-modulation (XPM). XPM is intrinsic to the generation of stimulated Raman scattering pulses, second harmonic generation pulses, and stimulated four photon mixing pulses. XPM can be used to control the temporal, spectral, and spatial properties of ultrashort probe pulses. XPM can be accompanied by degenerate-four-wave mixing (DFWM) which results in amplification of the probe pulses.

According to this invention two light pulses with the same frequency but different polarizations and intensities interact in condensed matter in a manner such as to produce compression and amplification of the weaker pulse. This is hereinafter referred to as degenerate (DXPM) cross-phase modulation combined with degenerate-four-wave mixing (DFWM).

The underlying theory is set forth below.

The total electric field of two pulses can be written in the form of:

$$E = \tfrac{1}{2}\{xA_x(r, z, t - t_d)\exp[i(\omega_0 t - k_x z)] + \quad (1)$$

$$yA_y(r, z, t)\exp[i(\omega_0 t - k_y z)]\} + c.c.$$

Using the slowly varying envelope approximation, one obtains the coupled nonlinear wave equation which governs the two polarization components:

$$\frac{\partial A_x}{\partial z} + \frac{1}{v_{gx}} \frac{\partial A_x}{\partial t} + i\frac{1}{2} k^{(2)} \frac{\partial^2 A_x}{\partial t^2} = \quad (2a)$$

$$i\frac{\omega_0 n_2}{c}\left[\left(|A_x|^2 + \tfrac{2}{3}|A_y|^2\right)A_x + \tfrac{1}{3} A_y^2 A_x^* \exp(-i2\Delta kz + i2\omega_0 t_d)\right],$$

$$\frac{\partial A_y}{\partial z} + \frac{1}{v_{gy}} \frac{\partial A_y}{\partial t} + i\frac{1}{2} k^{(2)} \frac{\partial^2 A_y}{\partial t^2} = \quad (2b)$$

$$i\frac{\omega_0 n_2}{c}\left[\left(|A_y|^2 + \tfrac{2}{3}|A_x|^2\right)A_y + \tfrac{1}{3} A_x^2 A_y^* \exp(-i2\Delta kz + i2\omega_0 t_d)\right],$$

where $v_{gx}$ and $v_{gy}$ are group velocities for lights polarized along x-axis and y-axis, respectively, $k^{(2)}$ is the group velocity dispersion, $n_2 = 3x^{(3)} xxxx/8n$ is the nonlinear refractive index, $\Delta k = k_x - k_y$ is the propagation constant mismatch between the two orthogonally polarized waves, and $\omega_0 t_d$ is the time delay phase. The last term in Eqs. (2a) or (2b) is the degenerate four-wavemixing (DFWM), which modulates the amplitude as well as the phase. The strength of DXPM process depends on the extent to f the phase matching between the orthogonally polarized pump and probe pulses characterized by the beat length $L_B = 2\pi(k_x - k_y)$. If the length of the medium $L >> L_B$, the contribution of last terms in Eqs. (2a) and (2b) can be negligible. The coupling term for the DXPM is weaker than that of XPM since the coefficient for the cross term is $\frac{2}{3}$ for DXPM instead of 2 for XPM. All the solutions for XPM between two waves at different frequencies are valid to this DXPM case by replacing the factor 2 by $\frac{2}{3}$. In some cases, such as in non-birefringent media, $\Delta k$ can be assumed to be zero. Under this condition ($\Delta K = 0$) and when $\omega_0 t_d = n\pi$, the contribution from the DFWM term $A_x^2 A_y^*$ to the amplitude and phase modulations must be taken into consideration.

A numerical analysis is used to solve Eqs. (2a) and (2b) in the degenerate case where SPM of the weak probe pulse is neglected and $v_{gx} = v_{gy} = v_g$ is assumed to simplify the analysis. Introducing the dimensionless variables[5]:

$$T = \tau/T_o, \epsilon = z/L_D, U_j = A_j/\sqrt{\frac{P_j}{A_{\it eff}}}, \quad (3)$$

where $$L_D = T_o^2/|k^{(2)}| \quad (4)$$

is the dispersion length, over which the pulse duration increase about 40% due to the dispersion effect, $\tau = (t - z/v_g)$, $T_o$ is the 1/e pulse duration, $A_{\it eff}$ is the effective cross section area, and $P_j$ are the peak powers of input pulses.

The coupled nonlinear wave equations (2a) and (2b) reduce to $$i\frac{\partial U_x}{\partial \xi} = \pm \frac{1}{2} \frac{\partial^2 U_x}{\partial T^2} - N^2 |U_y|^2 U_x, \quad (5a)$$

$$i\frac{\partial U_y}{\partial \xi} = \pm \frac{1}{2} \frac{\partial^2 U_y}{\partial T^2} - N^2 \left[\frac{2}{3}|U_x|^2 U_y + \frac{1}{3} U_x^2 U_{y'}\right], \quad (5b)$$

where $$N^2 = L_D/L_{NL}, \quad (6)$$

and $$L_{NL} = \left[\frac{\omega_0 n_2 P_o}{c A_{\it eff}}\right]^{-1} \quad (7)$$

is the nonlinear length. The choice of the sign in the dispersion term depends on the sign of $k^{(2)}$, a plus sign is for normal GVD ($K^{(2)} > 0$) and a minus sign is for anomalous GVD ($k^{(2)} < 0$). For example, $\lambda < 1.3$ m is the normal dispersion regime for silica fibers. At $\lambda = 0.53$ μm, the group dispersion $k^{(2)}$ is about 0.06 ps$^2$/m. From Eq. (4), $L_D \sim 0.1$ m for $T_o = 100$ fs. Given single mode fiber and $P_o \sim 1000$ W, from Eq. (7) $L_{NL} \sim 0.1$ m. Substituting these values into Eq. (6), one can find $N \sim 1. \lambda > 1.3$ m is the anomalous dispersion regime for glass fibers. At $\lambda = 1.55$ m, $k^{(2)} \sim 0.02$ ps$^2$/m. In this case, $L_D \sim 0.5$ m for $T \sim 100$ fs, and $L_{NL} \sim 0.1$ m for $P_o \sim 1000$ W. Thus $N \sim 1$. $N = 1$ corresponds to fundamental soliton, and $N > 1$ corresponds to higher order solitons[2,5]. For liquid samples, the peak power of the pump pulse can be much higher than that in solids. In this case, N may be in the order of 10.

When an ultashort light pulse propagates through a medium, its shape changes considerably as a result of the combined effect of group velocity dispersion $k^{(2)}$ and self-phase-modulation. In the anomalous dispersion regime of fiber, the pulse can be compressed or split, which are characteristic of higher order soliton, at certain critical power level. In the normal dispersion regime, the pulse can develop rapid oscillations in the wings together with the spectral sidclobes as a result of a phenomenon known as optical wave breaking. It has been shown that rapid oscilations near one edge of a weak probe pulse that copropagates with a strong pump pulse can result from the effect of combination of GVD and XPM.

The compression effect in anomalous regime is the same as the soliton-effect compression except that the frequency chirp of the weak probe pulse is induced by the strong pump pulse. It is obvious that to get the probe pulse compressed, the initial delay between the two pulses must be zero.

FIG. 1 displays the numerical solution of DXPM Eqs. (5a) and (5b), for a probe pulse (solid curves) under single a pump (dot curves) pulse in normal dispersion regime with the normalized delay between the probe pulse and the pump pulses $T_d = 2$ and $k = 0$, so as to provide DFWM. The initial pulse shapes are Gaussian for both pump and probe. In this case, the leading edge of the pump pulse induced a red chirp on the back part of the probe pulse. This process results in pulse compression in normal dispersion regime since the red chirped lights travel faster. The probe pulse is amplified as well as compressed. However, the compressed pulse is not symmetric.

Figure 2:
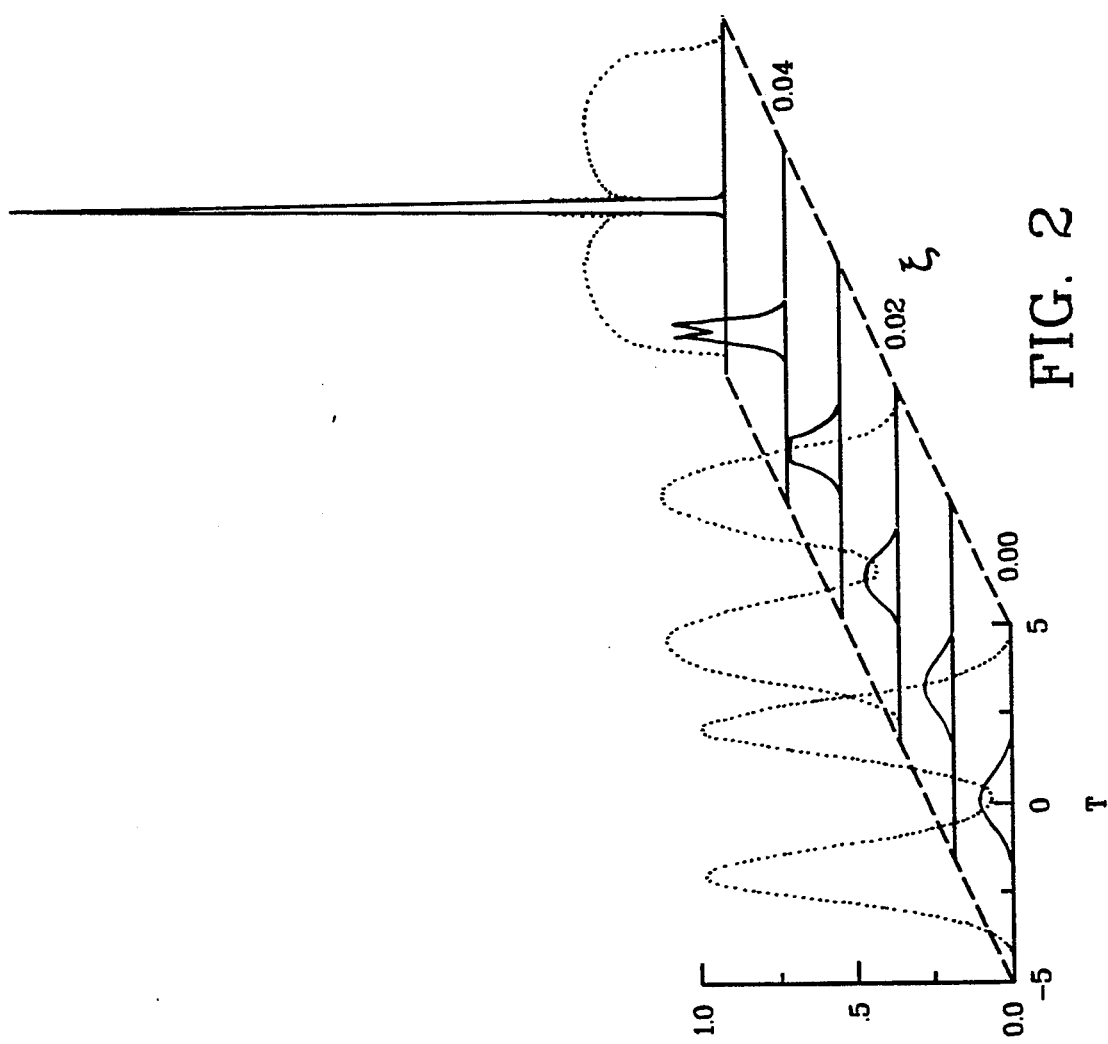
FIG. 2 is a diagram illustrating the changes in envelope shape of a single probe pulse under dual pump pulse DXPM in normal dispersion regime along the propogation length $N=30$ and $T_d=2$. Solid lines are the evolution of the probe pulse shape enlarged by 10 times. Dotted lines are evolution of the pump pulse shapes.

To improve the quality of the compressed pulse, dual pump pulses may be employed. FIG. 2 shows the numerical solution of DXPM Eqs. (5a) and (5b) for probe (solid curves) under dual pump (dot curves) pulses in normal dispersion regime with the normalized delay between the probe pulse and the pump pulses $T_d = 2$ and $k = 0$. The initial pulse shapes are also Gaussian for both pump and probe. In this case, the trailing edge of the first pump pulse induced a blue chirp on the front part of the probe pulse while the leading edge of the second pump pulse induced a red chirp on the back part of the probe pulse. This process results in significant pulse compression in normal dispersion regime since blue light travels slower than the red. The compressed pulse is symmetric and the pulse duration can be reduced by a factor of 15. The weak probe pulse is also amplified by the pump pulses because of the existence of degenerate four-wave mixing. The amplification, in turn, improves the quality of the compressed pulse. The amplification depends on the interaction length. In the above case the output energy of the probe pulse at 0.05 is about 2.3 times its input value. The power gain is about 30 times.

Figure 3A:
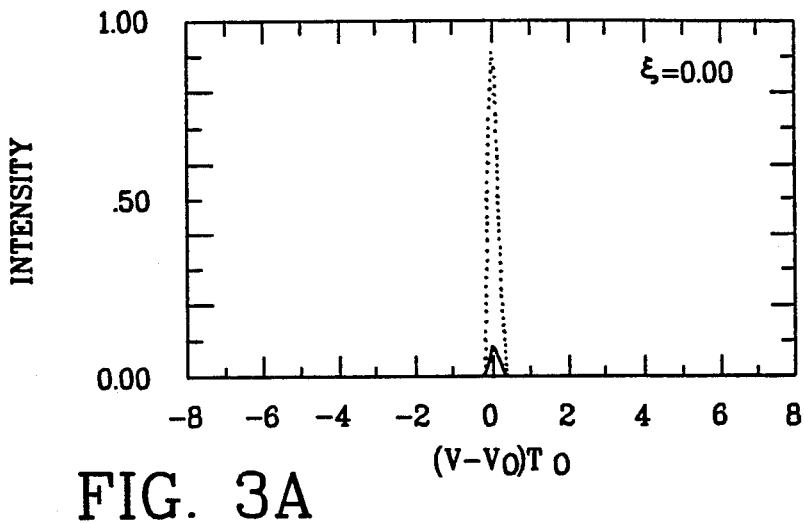
FIGS. 3(a) through 3(c) illustrate the spectral distribution for dual DXPM. Solid lines are the profiles of probe pulses enlarged by 10 times. Dot lines are the spectral profiles of the pump pulses for $N=30$ and $T_d=2$.
Figure 3B:
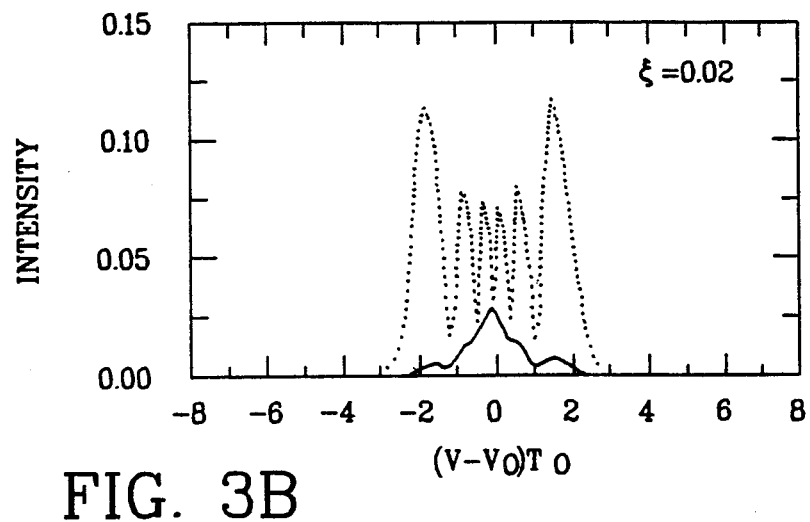
Figure 3C:
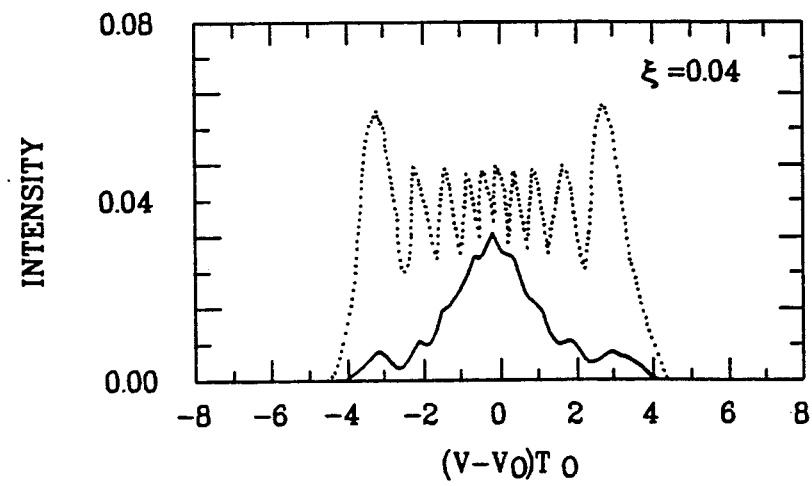

FIGS. 3(a) through 3(c) display the change of the spectra for the pulse arrangement shown in FIG. 2. The induced chirp of the probe pulse occurs at both the leading and trailing parts. The frequency of the central part of the pulse remain unchanged and the spectrum distribution profile is symmetric and most of the pulse intensity is near the input frequency.

A typical experimental setup for ultrashort laser pulse compression and amplification using DXPM with DFWM and the measurement of the pulse is shown in FIG. 4.

Referring now to FIG. 4, there is illustrated a schematic representation of an experimental system for producing compression and amplification for a pulse of light using DXFM with DFWM and measuring the pulse so compressed and amplified, the system being constructed according to the teachings of the present invention and represented generally by reference numeral 11.

System 11 includes a laser 13 for producing an ultrashort (i.e. picosecond or femtosecond) pulse of light. Laser 13 may be for example a mode locked Nd:YAG laser or a semiconductor laser or a mode locked semiconductor laser. A polarizer 15 is disposed along the path of the pulse for linearly polarizing the pulse by light from laser 13. A beam splitter 17 is disposed along the path of the polarized pulse for splitting the pulse into a pair of pulses 18-1 and 18-2 travelling along path 19 and 21, respectively. The pulse travelling along path 19 is deflected off a mirror 23 and fed into a cross-correlator 25.

A rotator 27 is disposed along path 21 to rotate the polarization of the pulse travelling in that path a certain number of degrees. Preferably, rotator 27 modifies the polarization of the pulse by about 10 degrees.

A polarization beam splitter 29 is disposed along path 21 after rotator 27 to split the rotated pulse into a pair of pulses, one travelling along a path 31 and the other travelling along a path 33. Rotator 27 is constructed so that the pulse travelling along path 31 constitutes a probe pulse and is weaker in intensity than the pulse travelling along the other path. The relative intensities of the two pulses are a function of the size of the angle of rotation provided by rotator 27. The intensity of the probe pulse relative to the other pulse may be increased by increasing the angle of rotation of rotator 27.

A quarter waveplate 35 and a mirror 37 are disposed along path 31. Mirror 37 is movable in the direction shown by arrows A so that the path length from it to beamsplitter 29 can be changed (i.e. increased or decreased) as desired. Quarter-wave plate 35 is used to change the polarization of the beam travelling along path 31 by 90 degrees (i.e. 45 degrees each time it passes through it) so that the pulse will pass through beamsplitter 29 on returning from mirror 37 rather than being deflected by beam splitter 29.

A quarter-wave plate 39 and a beam splitter 41 are disposed along the path of the pulse travelling along path 33. Quarter-wave plate 39 rotates the polarization by 45 degrees. Beam splitter 41 splits the pulse into a pair of pulses, which serve as pump pulses, one travelling along a path 43 and the other travelling along a path 45. Preferably, the two pump pulses are identical in shape and intensity. Mirrors 47 and 49, respective, are disposed along paths 43 and 45 respectively. Mirrors are movable in the direction shown by arrows B and C, respectively, so that the path lengths of their respective pulses can be adjusted. The lengths of the paths are preferably selected so that, upon their recombination at polarizing beam splitter 29, one of the pump pulses overlaps the front end of the probe pulse and the other pump pulse overlaps the tail end of the probe pulse.

The two pump pulses 50-1 and 50-2 and the probe pulse 50-3 co-propogate along path 51.

A first lens 53 disposed along path 51 brings the three pulses to focus in a body of condensed matter 113. A second lens 57 is disposed on the other side of the body of condensed matter 55 to recollimate the pulses. A polarizer 59, which is selective for light possessing the polarization of probe pulse 50-3, is disposed along the path of the pulses after lens 57. Because pulses 50-1 and 50-2 have a different polarization than pulse 50-3, polarizer 59 will filter out pump pulses 50-1 and 50-2. Pulse 50-3 is then sent into cross-correlator 25 where it is compared to pulse 18-1.

The construction and operation of cross-correlator 25, are set forth in detail by A. Kalpaxis et al. in Rev. Sci. Instrum, Vol. 53, No. 7, pp. 960–962, July 1982. Cross-correlator 25 compares the durations of pulses 18-1 and 50-3. If pulse 50-3 has been compressed, pulses 18-1 and 50-3 will overlap partially, resulting in the generation of a small second harmonic. In contrast, if pulse 50-3 has not been compressed, pulses 18-1 and 50-3 will overlap completely, resulting in a comparatively greater second harmonic.

Figure 5:
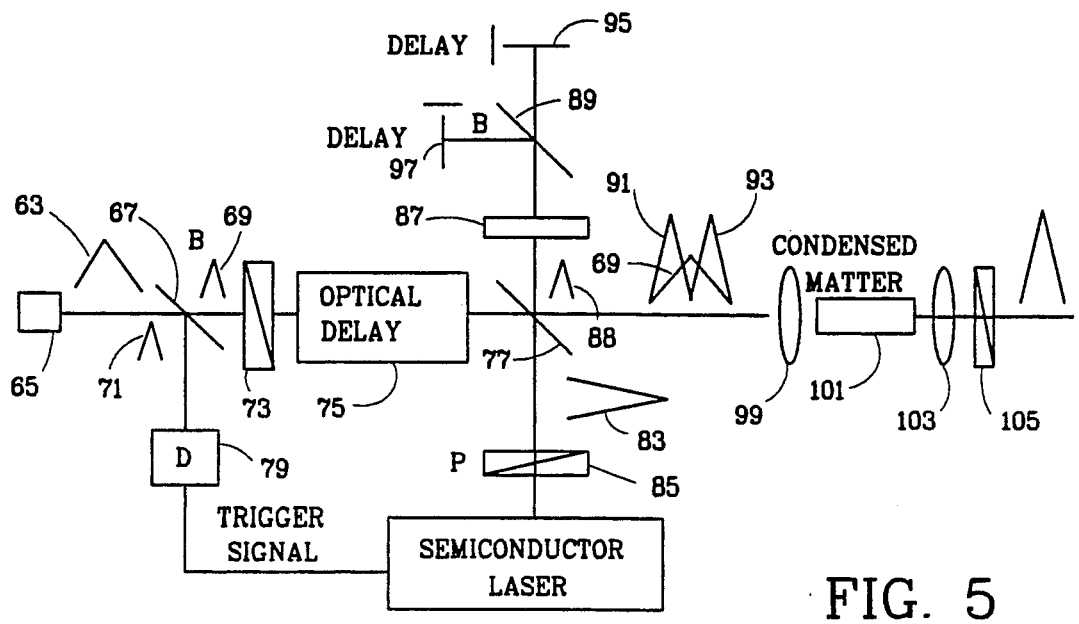
FIG. 5 is a schematic representation of one embodiment of a light pulse compression and amplification unit being constructed according to the teachings of the present invention.

Referring now to FIG. 5, there is illustrated a schematic representation of one embodiment of a system for compressing and amplifying a pulse of light, the system being constructed according to the teachings of the present invention and represented generally by reference numeral 61.

A pulse of light 63 from a pulse laser 65 strikes a beamsplitter 67 where it is split into a transmitted pulse 69 and a reflected pulse 71. Beam-splitter 67 is preferably constructed so that the intensity of pulse 69 is much greater than the intensity of pulse 71. Transmitted pulse 69 is polarized by polarizer 73, delayed by an optical delay 75 and then strikes beamsplitter 77.

A light detector 79 disposed along the path of pulse 71 converts pulse 71 into an electrical signal which is used to trigger a semiconductor pulse laser 81. Detector 79 may be, for example a photomultiplier tube. Laser 81, which may be for example a colliding pulse mode locked laser emits an intense pulse of light 83. Pulse 83 has the same frequency as pulse 63. Both pulse 63 and pulse 83 may be monochromatic, although this is not necessary. "Monochromatic" as used in the present specification and claims is meant to convey that a pulse of light is substantially of one frequency (or frequency band).

Pulse 83 is polarized by a polarizer 85 in the same way as pulse 69 and then strikes beamsplitter 77. A quarter wave plate 87 rotates by 45 degrees the pulse 88 constituting the portion of the pulse 83 passing through beamsplitter 77. A beamsplitter 89 splits the pulse 88 after it passes through quarter wave plate 87 into two pulses 91 and 93 of identical intensity, pulse 91 being the transmitted pulse and pulse 93 being the reflected pulse. A pair of mirrors 95 and 97 are disposed along the paths of pulses 91 and 93, respectively. Mirrors 95 and 97 are movable in the direction shown by arrows C and D, respectively so as to change, as desired, the relative path lengths of pulses 91 and 93 for reasons to be discussed below. After being reflected off their respective mirrors, pulses 91 and 93 are recombined by beamsplitter 89, directed back through quarter waveplate 87 where the polarization is rotated another 45 degrees and then reflected off beamsplitter 77 along path 78. As is apparent, pulses 91 and 93 are orthoganally polarized relative to pulse 69.

A lens 99 disposed along path 78 focuses pulses 69, 91, and 93 into a body of condensed matter 101. Condensed matter 101 may be any type of solid or liquid which will result in the propagation constant mismatch between pulse 69 and pulses 91 and 93 being zero (e.g.

birefringent materials). A lens 103 disposed on the other end of condensed matter 101 re-collimates the light pulses exiting therefrom. Finally, a polarizer 105, which is selective for light possessing the polarity of pulse 69, but not pulses 91 and 93 is disposed after lens 103 for filtering out pulse 91 and 93.

In use, pulse 69 is delayed by optical delay 75 so that pulse 69 will arrive at beamsplitter 77 at about the same time as pulses 83. Also the path length traveled by pulse 91 is sufficiently greater than that traveled by pulse 93 so that, upon their recombination at beamsplitter 77, pulse 91 is temporally delayed relative to pulse 93 and so that pulse 91 overlaps with the front end of pulse 15 and pulse 93 overlaps with the tail end of pulse 69. Where, as in the present embodiment, the pump pulses are identical in shape and amplitude, the overlap between the weak pulse and the two pump pulses are preferably symmetrical so that the weak pulse will be compressed symmetrically. The amount of overlap which will maximize compression of the weak pulse depends on a variety of factors, including the length of the condensed matter and the linear coefficient of the condensed matter.

Figure 6:
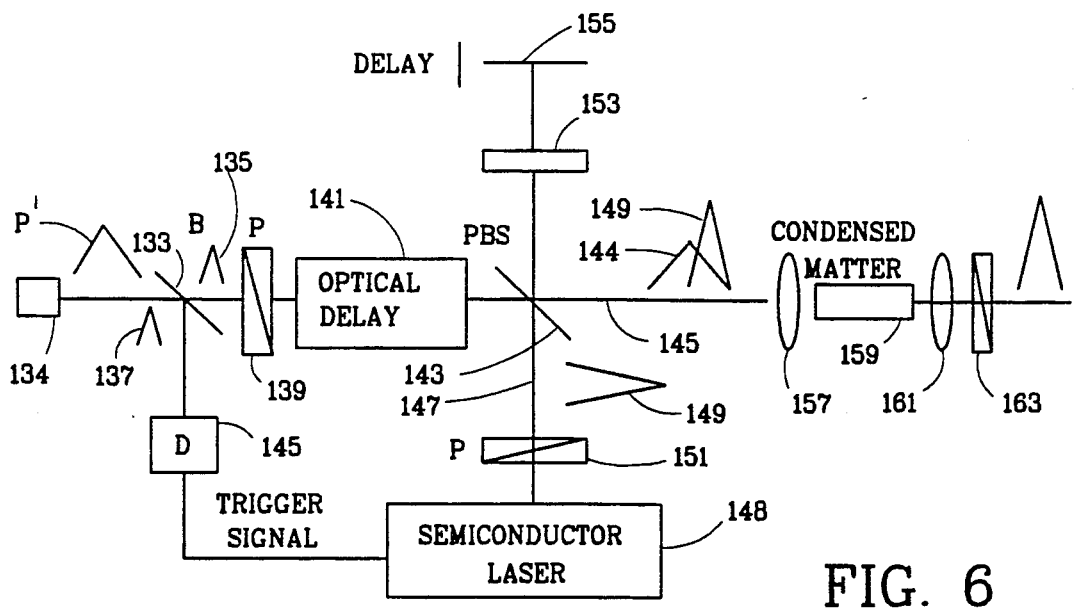
FIG. 6 is a schematic representation of a modification of the unit for compressing and amplifying a light pulse shown in FIG. 5.

Referring now to FIG. 6, there is disclosed a schematic representation of another embodiment of a system for compressing and amplifying a light pulse, the system being constructed according to the teachings of the present invention and represented generally by reference numeral 131.

System 131 includes a beamsplitter 133 which splits a pulse of light P', from a laser 134, into a pair of pulses 135 and 137. Beamsplitter 133 is 4% beamsplitter similar to beamsplitter 67. Pulse 135 is polarized by polarizer 139, delayed by optical delay 141 and then strikes a beamsplitter 143 where it is split into a transmitted pulse 144 traveling along path 145 and a reflected pulse traveling along path 147.

A detector 145 which is disposed along the path of pulse 137 converts pulse 137 into an electrical signal which is used to trigger a laser 148. Detector 145 may be for example, a photodiode or a photomultiplier tube or a pin diode. Laser 148, which is a colliding pulse mode locked laser or a mode locked semiconductor laser emits an intense pulse of light 149. The pulse of light 149 is polarized by a polarizer 151 and then passes through beamsplitter 143. The pulse emerging therefrom passes through a quarter wave plate 153 and strikes a mirror 155. The pulse reflected by mirror 155 is then reflected by beamsplitter 143, the reflected beam travelling along path 145 along with pulse 144. A lens 157 disposed along the path 145 focuses pulses 144 and 149 into a body condensed matter 159. Condensed matter 159 is preferably a non-birefringent material and, in particular, is a non-birefringent optical fiber or crystal, an isotropic liquid or other material which will result in a propagation constant mismatch between pulses 144 and 149 of zero. If condensed matter 159 is a birefringent material, then other parameters of the system are adjusted to ensure that the propagation constant mismatch between the two pulses is equal to zero. A lens 161 is disposed at the opposite end of condensed matter 159 to re-collimate the pulses. A polarizer 163, which is selective for light possessing the polarization of pulse 144, is disposed along the path of the pulses after lens 161. Because pulse 149 possesses a polarization different from pulse 144, pulse 149 is filtered out by polarizer 163.

In use, pulses 135 is delayed by optical delay 143 so that it will arrive at beamsplitter 143 at about the same time as pulse 149.

At beamsplitter 143, pulse 144 is combined with pulse 149 in such a way that pulse 149 overlaps the front end of pulse 135, as shown.

Figure 7:
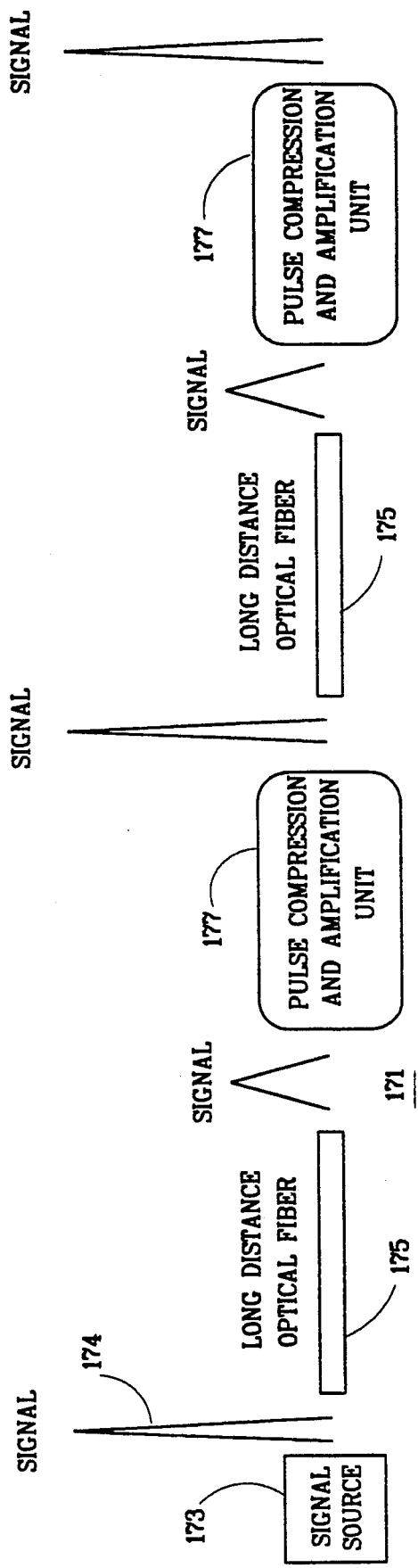
FIG. 7 is a schematic representation of one embodiment of an optical communications system constructed according to the teachings of the present invention using the light pulse compression and amplification unit shown in FIG. 5.

Referring now to FIG. 7, there is illustrated an optical communications system constructed according to the teachings of the present invention and represented generally by reference numeral 171.

System 171 includes a signal source 173, such as a pulse laser, for generating a signal pulse of light 174. System 171 also includes a plurality of lengths of long distance optical fiber 175 for transmitting pulse 174 from signal source 173 to a distant location and a plurality of pulse compression and amplification units 177 for compensating for losses in amplitude and widening of the pulse in the course of travelling from signal source 173 through the long distance optical fibers. Units 177 are identical in construction to unit 61. As can be seen, fibers 175 are disposed in series with each pair of fibers being separated by a pulse compression and amplification unit 177. Thus, each time the pulse has a loss in amplitude and is widened on passing through a fiber it will be amplified and compressed by the next following compression and amplification unit 177.

Although the present invention has been described in connection with preferred embodiments, it is understood that those skilled in the art are capable of making modifications and variations without departing from the scope or spirit of the present invention. Therefore, the foregoing description of preferred embodiments is not to be taken in a limiting sense, and the present invention is best defined by the following claims and their equivalents.

What is claimed is:

1. An optical communications system, comprising:
   a) means for generating a pulse of laser light;
   b) a long-distance optical fiber disposed along the path of said laser light pulse for transmitting said laser light pulse from one location to another, said laser light pulse becoming de-compressed and losing amplification on passing through said long-distance optical fiber; and
   c) a pulse compression and amplification unit disposed at the egress of said optical fiber for amplifying and compressing said pulse of laser light, said pulse compression and amplification unit comprising:
      i) means for splitting said pulse of laser light into a first pulse of light and a second pulse of light.
      ii) means for polarizing said first pulse of light,
      iii) means for generating from said second pulse of light, a third pulse of light having the same frequency as, but a different polarization from and a greater intensity than, said first pulse of light and a fourth pulse of light having the same frequency as, but a different polarization from and a greater intensity than, said first pulse of light, said generating means comprising a detector for converting said second pulse into an electrical signal and a laser responsive to said electrical signal,
      iv) means for combining along a single path said first pulse, said third pulse and said fourth pulse so that said third pulse overlaps with the front end of said first pulse and said fourth pulse symmetrically overlaps with the tail end of said first pulse, v) condensed matter disposed along said single path,
vi) the propagation constant mismatch between said first pulse and each of said second and third pulses being about zero,
vii) whereby upon copropagating in said condensed matter, said third pulse compresses and amplifies the front end of said first pulse and said fourth pulse symmetrically compresses and amplifies the tail end of said first pulse, and
viii) polarizing means for separating said compressed and amplified first pulse emerging from said condensed matter from said third pulse and said fourth pulse.

2. The optical communications system as claimed in claim 1 wherein said condensed matter is a non-birefringent optical fiber.

3. The optical communications system as claimed in claim 2, further comprising, a second long distance optical fiber optically coupled to the output of said pulse compression and amplification unit and a second pulse compression and amplification unit coupled to the output of said second long distance optical fiber.

4. The optical communication system of claim 1 and wherein said means for generating third and fourth pulses of light comprises a semiconductor laser.

5. The optical communication system of claim 4 and wherein said semiconductor laser is a mode locked semiconductor laser.

6. The optical communication system of claim 1 and wherein said detector comprises a pin diode or a photodiode or a photomultiplier tube.

7. A system for compressing and amplifying an ultrashort pulse of laser light comprising:

a. a beamsplitter for splitting said ultrashort pulse of laser light into two pulses,
b. a polarizer for linearly polarizing one of said pulses,
c. a detector for converting the other of said pulses into an electrical signal,
d. a laser responsive to said electrical signal for emitting an intense pulse of light of the same frequency as the ultrashort pulse of laser light,
e. a polarizer for linearly polarizing said intense pulse of light in the same manner as the ultrashort pulse of light,
f. means for producing from said polarized intense pulse of light two orthogonally polarized intense pulses of light,
g. means for combining along a single path and in overlapping relationship said two orthogonally polarized intense pulses with said linearly polarized pulse, the propagation constant mismatch between said linearly polarized pulse and each of said two orthogonally polarized intense pulses being about zero,
h. condensed matter along said path for causing said linearly polarized transmitted pulse to be amplified and compressed, and
i. a polarizer for removing the two orthogonally polarized intense pulses emerging from the condensed matter.

8. The system of claim 7, wherein the combining means includes an optical delay unit.

9. The system of claim 7, wherein said producing means comprises a quarter wave plate, a beamsplitter and a pair of mirrors.

* * * * *